(12) United States Patent
Hashimoto et al.

(10) Patent No.: US 9,315,922 B2
(45) Date of Patent: Apr. 19, 2016

(54) POLYESTER-BASED FIBER FOR ARTIFICIAL HAIR AND HAIR ORNAMENT PRODUCT INCLUDING THE SAME

(71) Applicant: KANEKA CORPORATION, Osaka-shi, Osaka (JP)

(72) Inventors: Tomomichi Hashimoto, Settsu (JP); Tomokazu Higami, Settsu (JP); Mika Yorizane, Settsu (JP); Kohei Kawamura, Settsu (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 14/402,970

(22) PCT Filed: May 31, 2013

(86) PCT No.: PCT/JP2013/065222
§ 371 (c)(1),
(2) Date: Nov. 21, 2014

(87) PCT Pub. No.: WO2013/180281
PCT Pub. Date: Dec. 5, 2013

(65) Prior Publication Data
US 2015/0141559 A1    May 21, 2015

(30) Foreign Application Priority Data

May 31, 2012   (JP) ................................. 2012-124648

(51) Int. Cl.
*D01F 1/07*   (2006.01)
*D01F 6/62*   (2006.01)
(Continued)

(52) U.S. Cl.
CPC .. *D01F 6/92* (2013.01); *A41G 3/00* (2013.01); *A41G 5/00* (2013.01); *D01F 1/07* (2013.01);
(Continued)

(58) Field of Classification Search
CPC .............. A41G 3/00; A41G 5/00; D01F 6/62; D01F 6/92; D01F 1/07; C08K 5/52; C08K 5/53
See application file for complete search history.

(56) References Cited

U.S. PATENT DOCUMENTS

2002/0103267 A1 * 8/2002 Suzuki ........................... 521/40
2006/0154062 A1   7/2006 Kowaki et al.
(Continued)

FOREIGN PATENT DOCUMENTS

JP          61204252 A  *  9/1986
JP       2005-042234       2/2005
(Continued)

OTHER PUBLICATIONS

Derwent abstract of JP 61-204252 (Acc. No. 1986-281195, 1986, 2 pages).*
(Continued)

*Primary Examiner* — Brieann R Fink
(74) *Attorney, Agent, or Firm* — Hamre, Schumann, Mueller & Larson, P.C.

(57) ABSTRACT

A polyester-based fiber for artificial hair of the present invention is a polyester-based fiber for artificial hair formed of a polyester resin composition. The polyester resin composition contains 5 to 40 parts by weight of a brominated epoxy flame retardant and 0.05 to 5 parts by weight of an acidic compound with respect to 100 parts by weight of a polyester resin. The polyester resin is one or more kind of resin selected from the group consisting of polyalkylene terephthalate and copolymerized polyester containing polyalkylene terephthalate as a main component. The acidic compound is an acidic phosphorus-based compound having a pH of 3.5 or less. A hair ornament product of the present invention contains the polyester-based fiber for artificial hair.

13 Claims, 1 Drawing Sheet

(51) Int. Cl.
  *D01F 6/92* (2006.01)
  *A41G 3/00* (2006.01)
  *A41G 5/00* (2006.01)
  *D01F 1/10* (2006.01)
  *C08L 67/00* (2006.01)
  *C08K 5/53* (2006.01)
  *C08K 5/52* (2006.01)
(52) U.S. Cl.
  CPC .. *D01F 1/10* (2013.01); *D01F 6/62* (2013.01); *C08K 5/52* (2013.01); *C08K 5/53* (2013.01); *C08L 67/00* (2013.01)

(56) References Cited

U.S. PATENT DOCUMENTS

2006/0194044 A1   8/2006   Kowaki et al.
2007/0155870 A1   7/2007   Kowaki et al.
2008/0085957 A1   4/2008   Masuda

FOREIGN PATENT DOCUMENTS

| JP | 2005-264397 | | 9/2005 |
| JP | 2007-084952 | | 4/2007 |
| JP | 2007084952 A | * | 4/2007 |
| WO | 2005/010247 | | 2/2005 |
| WO | 2005/056894 | | 6/2005 |
| WO | 2005/100650 | | 10/2005 |

OTHER PUBLICATIONS

Sakamoto Yakuhin Kogyo Co. (Flame Retardants: Product Characteristics. Sakamoto Yakuhin Kogyo Co. 2015. 2 pages).*
Machine translated English language equivalent of JP 2007-084952 A (Apr. 2007, 14 pages).*

* cited by examiner

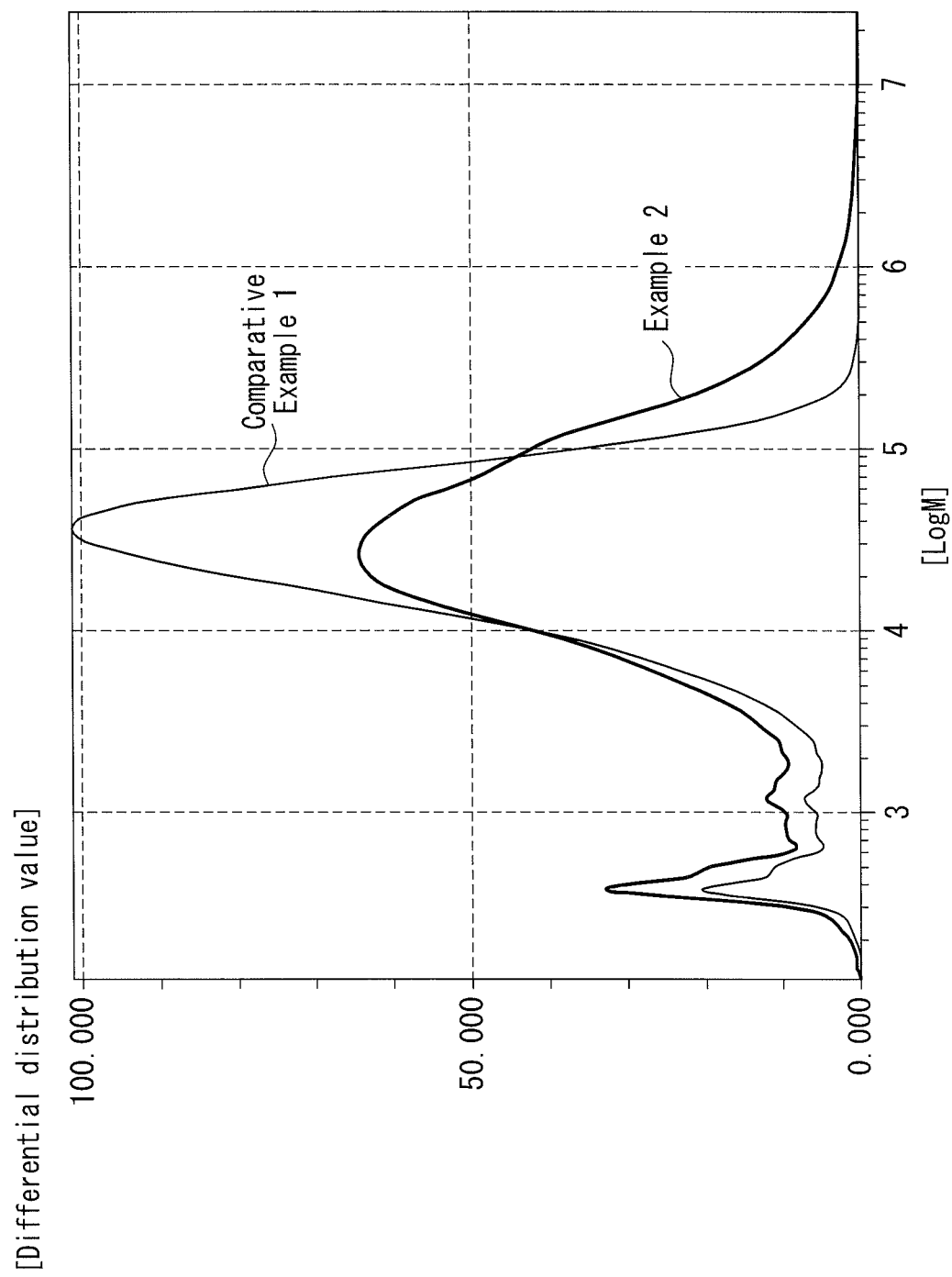

US 9,315,922 B2

POLYESTER-BASED FIBER FOR ARTIFICIAL HAIR AND HAIR ORNAMENT PRODUCT INCLUDING THE SAME

TECHNICAL FIELD

The present invention relates to a polyester-based fiber for artificial hair capable of being used as an alternative to human hair and a hair ornament product including the polyester-based fiber for artificial hair. Specifically, the present invention relates to a polyester-based fiber for artificial hair having gloss close to that of human hair and a hair ornament product including the polyester-based fiber for artificial hair.

BACKGROUND ART

In hair ornament products such as a hairpiece, a hair wig, crepe hair, a hair band, and doll hair, human hair has been conventionally used. However, in recent years, it is becoming difficult to obtain human hair, and the importance of fibers for artificial hair, instead of human hair, is increasing. As a fiber material for artificial hair, modacrylic fibers have been used in most cases, taking advantage of the feature of flame retardance; however, the modacrylic fibers do not have sufficient heat resistance. Then, it has been proposed that polyester-based fibers excellent in heat resistance be used as fibers for artificial hair. However, the polyester-based fibers are usually spun by melt spinning, and hence have a very smooth fiber surface and peculiar mirror-surface gloss although having sufficient heat resistance. Therefore, when the polyester-based fibers are used for hair ornament products to be attached to human hair, such as a hair wig or a hairpiece, a feeling of wrongness is caused.

Then, various methods for ameliorating gloss of the polyester-based fibers have been studied. For example, Patent Document 1 proposes that a brominated epoxy flame retardant and organic fine particles and/or inorganic fine particles be added to a polyester resin. Patent Document 2 proposes that brominated epoxy flame retardant having a number-average molecular weight of 20,000 or more be added to a polyester resin. Patent Document 3 proposes that a brominated epoxy flame retardant and a reaction accelerator be added to a polyester resin. Patent Document 4 proposes that a brominated epoxy flame retardant and an ester interchange suppressor be added to a polyester resin.

PRIOR ART DOCUMENTS

Patent Documents

Patent Document 1: JP 2005-42234 A
Patent Document 2: JP 2005-264397 A
Patent Document 3: International Publication WO 2005/056894
Patent Document 4: JP 2007-084952 A

DISCLOSURE OF INVENTION

Problems to be Solved by the Invention

However, in the proposal of Patent Document 1, the brominated epoxy flame retardant is finely dispersed in fibers due to its high compatibility with the polyester resin. Therefore, the addition of the brominated epoxy flame retardant is not sufficiently reflected on the unevenness of a fiber surface, and the gloss is suppressed mainly by the organic fine particles and the inorganic fine particles. Thus, there still remains room for improvement in ensuring sufficient color development, and there also remains room for improvement in suppressing the gloss after ensuring spinning stability. In Patent Document 2, the gloss is adjusted by finely dispersing the brominated epoxy flame retardant in polyester through use of a brominated epoxy flame retardant having a number-average molecular weight of 20,000 or more. However, there still remains room for improvement in reaching a level required on the market. In Patent Document 3, the compatibility between the brominated epoxy flame retardant and the polyester resin is increased by accelerating the ester interchange reaction therebetween through use of the reaction accelerator. However, the brominated epoxy flame retardant is more finely dispersed, and hence it cannot be exactly said that the effect of suppressing the gloss is enough. Further, in Patent Document 4, the compatibility between the brominated epoxy flame retardant and the polyester resin is decreased with the ester interchange suppressor. However, an aggregation size of the brominated epoxy flame retardant is still small merely with the decrease in compatibility, and the effect of reducing the gloss is not enough. Further, when the ester interchange suppressor is added excessively, there is a problem in that a spinning property is remarkably degraded.

In order to solve the above-mentioned conventional problems, the present invention provides a polyester-based fiber for artificial hair having gloss close to that of human hair and a hair ornament product including the same.

Means for Solving Problem

The present invention relates to a polyester-based fiber for artificial hair formed of a polyester resin composition, in which the polyester resin composition contains 5 to 40 parts by weight of a brominated epoxy flame retardant and 0.05 to 5 parts by weight of an acidic compound with respect to 100 parts by weight of a polyester resin, the polyester resin is one or more kind of resin selected from the group consisting of polyalkylene terephthalate and copolymerized polyester containing polyalkylene terephthalate as a main component, and the acidic compound is an acidic phosphorus-based compound having a pH of 3.5 or less.

The present invention also relates to a hair ornament product including the above-mentioned polyester-based fiber for artificial hair.

Effects of the Invention

The present invention can provide a polyester-based fiber for artificial hair having gloss close to that of human hair and a hair ornament product including the polyester-based fiber for artificial hair by adding a brominated epoxy flame retardant and an acidic phosphorus-based compound having a pH of 3.5 or less to polyester-based fibers for artificial hair.

BRIEF DESCRIPTION OF DRAWINGS

FIG. 1 is a graph showing molecular weight distributions obtained by conducting a GPC measurement of each brominated epoxy flame retardant in polyester-based fibers in one example of the present invention and one comparative example.

DESCRIPTION OF THE INVENTION

The inventors of the present invention earnestly conducted repeated studies so as to solve the above-mentioned problems. As a result, the inventors of the present invention found that a polyester-based fiber for artificial hair, which is excellent in gloss required of fibers for artificial hair and has satisfactory flame retardance and a spinning property while keeping fiber physical properties such as heat resistance and strength and elongation of ordinary polyester-based fibers, is obtained through use of a resin composition prepared by adding a brominated epoxy flame retardant and an acidic phosphorus-based compound having a pH of 3.5 or less to a polyester resin, and thus achieved the present invention. Further, the inventors of the present invention found that combing properties, flame retardance, and a spinning property are further enhanced by adding a thickener. It should be noted that, in the case of a non-phosphorous acidic compound having a pH of 3.5 or less, the effect of accelerating the decomposition of the polyester resin is very large compared with that of the acidic phosphorus-based compound, and the viscosity of a polyester resin composition is remarkably decreased, which makes it impossible to obtain a yarn normally during spinning.

In general, a brominated epoxy flame retardant is finely dispersed in a polyester resin during melt kneading due to its high compatibility with respect to the polyester resin. Therefore, when the polyester resin composition containing the polyester resin and the brominated epoxy flame retardant is fiberized, the brominated epoxy flame retardant is drawn in a spindle shape having a thickness of 0.02 µm or less and an aspect ratio of 10 times or more, and thus hardly influences the shape of a fiber surface layer portion. Therefore, polyester-based fibers to be obtained have a smooth fiber surface and high gloss peculiar to plastic. In the present invention, by using the brominated epoxy flame retardant and the acidic phosphorus-based compound having a pH of 3.5 or less, the following effects are obtained: the acidic phosphorus-based compound serves as a ring-opening catalyst of an epoxy group at a molecular end of the brominated epoxy flame retardant, thereby polymerizing molecules of the brominated epoxy flame retardant through an epoxy group and binding the phosphorus-based compound and two or more epoxy groups to each other through an ester bond. Therefore, the molecular weight of the brominated epoxy flame retardant increases, the dispersibility of the brominated epoxy flame retardant is degraded, and the brominated epoxy flame retardant aggregates to have a thickness of 0.05 µm or more. Thus, the surface layer portion of the fibers is allowed to express roughness to reduce gloss to a level close to that of human hair.

The polyester-based fiber for artificial hair of the present invention refers to fibers formed of the polyester resin composition. In general, the polyester-based fiber for artificial hair can be formed by melt spinning the polyester resin composition. It should be noted that the polyester resin composition is generally melt spun after melt kneading. The polyester resin composition contains a polyester resin (hereinafter, also referred to as "A component"), a brominated epoxy flame retardant (hereinafter, also referred to as "B component"), and an acidic phosphorus-based compound having a pH of 3.5 or less (hereinafter, also referred to as "C component").

The polyester resin is one or more kind of resin selected from the group consisting of polyalkylene terephthalate and copolymerized polyester containing polyalkylene terephthalate as a main component. Although no particular limitation is imposed on the polyalkylene terephthalate, examples thereof include polyethylene terephthalate, polypropylene terephthalate, polybutylene terephthalate, and polycyclohexanedimethylene terephthalate. Although no particular limitation is imposed on the copolymerized polyester containing polyalkylene terephthalate as a main component, examples thereof include copolymerized polyester containing polyalkylene terephthalate such as polyethylene terephthalate, polypropylene terephthalate, polybutylene terephthalate, or polycyclohexanedimethylene terephthalate as a main component, and containing another copolymer component. The term "main component" as used herein means containing 80 mol % or more, and the term "copolymerized polyester containing polyalkylene terephthalate as a main component" refers to copolymerized polyester containing 80 mol % or more of polyalkylene terephthalate.

Examples of another copolymer component include: polycarboxylic acid such as isophthalic acid, orthophthalic acid, naphthalenedicarboxylic acid, paraphenylenedicarboxylic acid, trimellitic acid, pyromellitic acid, succinic acid, glutaric acid, adipic acid, suberic acid, azelaic acid, sebacic acid, and dodecanedioic acid, and derivatives thereof, dicarboxylic acid containing a sulfonate such as 5-sodiumsulfoisophthalic acid and dihydroxyethyl 5-sodiumsulfoisophthalate; 1,2-propanediol; 1,3-propanediol; 1,4-butanediol; 1,6-hexanediol; neopentylglycol; 1,4-cyclohexanedimethanol; diethylene glycol; polyethylene glycol; trimethylolpropane; pentaerythritol; 4-hydroxybenzoic acid, and ε-caprolactone.

As a specific example of the copolymerized polyester containing polyalkylene terephthalate as a main component, for example, there may be given copolymerized polyester containing polyethylene terephthalate as a main component, obtained by copolymerizing polyethylene terephthalate and one kind of a compound selected from the group consisting of ethylene glycol ether of bisphenol A, 1,4-cyclohexanedimethanol, isophthalic acid, and dihydroxyethyl 5-sodiumsulfoisophthalate.

The polyalkylene terephthalate and the copolymerized polyester containing polyalkylene terephthalate as a main component may be used alone or in combination of two or more kinds. It is preferred that, of those, copolymerized polyester containing polyethylene terephthalate, polypropylene terephthalate, polybutylene terephthalate, or polyethylene terephthalate as a main component, obtained by copolymerizing polyethylene terephthalate, polypropylene terephthalate, polybutylene terephthalate, or polyethylene terephthalate and ethylene glycol ether of bisphenol A; copolymerized polyester containing polyethylene terephthalate as a main component, obtained by copolymerizing polyethylene terephthalate and 1,4-cyclohexanedimethanol; copolymerized polyester containing polyethylene terephthalate as a main component, obtained by copolymerizing polyethylene terephthalate and isophthalic acid; and copolymerized polyester containing polyethylene terephthalate as a main component, obtained by copolymerizing polyethylene terephthalate and dihydroxyethyl 5-sodiumsulfoisophthalate be used alone or in combination of two or more kinds.

Although no particular limitation is imposed on the intrinsic viscosity (IV value) of the polyester resin, the intrinsic viscosity is preferably 0.3 to 1.2, more preferably 0.4 to 1.0. When the intrinsic viscosity is 0.3 or more, the mechanical strength of fibers to be obtained does not decrease, and there is no risk of dripping during a combustion test. Further, when the intrinsic viscosity is 1.2 or less, the molecular weight does not increase excessively, and the melt viscosity does not become too high. Thus, melt spinning can be performed easily, and the fineness of fibers is likely to be uniform.

In the present invention, as described above, the brominated epoxy flame retardant has the effect of reducing the gloss of the polyester-based fiber for artificial hair to a level close to that of human hair and also has the effect of enhancing flame retardance.

Although no particular limitation is imposed on the brominated epoxy flame retardant, it is preferred that the brominated epoxy flame retardant be a compound represented by the following general formula (1).

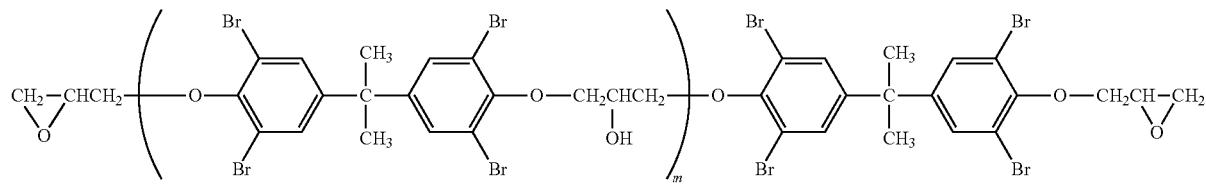

(1)

It should be noted that m is 1 to 1,000 in the above-mentioned general formula (1).

The brominated epoxy flame retardant is a compound represented by the general formula (1), and a weight-average molecular weight thereof is more preferably 2,000 to 40,000, still more preferably 5,000 to 30,000. In the present invention, in order to reduce the gloss of the polyester-based fiber for artificial hair, it is necessary that the molecular weight of the brominated epoxy flame retardant be high in fibers. However, when the viscosity of the brominated epoxy flame retardant is high before being melt kneaded with the polyester resin, it becomes difficult for the brominated epoxy flame retardant to be dispersed uniformly in the polyester resin, and an aggregate of the brominated epoxy flame retardant having a thickness of 10 µm or more is formed, which may cause breakage of a yarn and clogging of a nozzle during spinning. Therefore, it is preferred that the B component before being melt kneaded with the A component have viscosity equal to or lower than that of the A component that is a matrix. From the viewpoint of setting the viscosity of the B component to be equal to or lower than that of the A component, the weight-average molecular weight of the B component is preferably 2,000 to 40,000, more preferably 5,000 to 30,000. When the weight average molecular weight of the B component is 2,000 or more, a component having a molecular weight of 50,000 or more can be increased by 25% or more during melt kneading of the polyester resin composition, and hence the gloss is reduced sufficiently. Further, when the weight-average molecular weight of the B component is 40,000 or less, the B component does not aggregate in a non-uniform size to become more than 10 µm in the A component during kneading, and there is no risk in that the breakage of a yarn or the clogging of a nozzle occurs to degrade spinning stability.

In the present invention, although the brominated epoxy flame retardant having a structure represented by the general formula (1) is preferably used as a raw material, the structure of the brominated epoxy flame retardant after melt kneading is not particularly limited. For example, an epoxy group, a hydroxyl group, phosphoric acid, or phosphonic acid may be substituted for the molecular end of the brominated epoxy flame retardant, or the molecular end of the brominated epoxy flame retardant may be bonded to the A component through an ester group.

The molecular weight of the brominated epoxy flame retardant increases during melt kneading due to the function of the acidic phosphorus-based compound that is the C component as a catalyst and/or a cross-linking agent. For example, there are the following cases: the molecular weight increases through ring opening and condensation reactions of epoxy groups between molecules of the B component; one molecule of the phosphorus-based compound of the C component and one to three molecules of the B component are condensed through an ester bond of a phosphoric acid group and an epoxy group to increase the molecular weight; the B component and the A component are condensed through an ester bond; an epoxy group of the B component remains unreacted; and an epoxy group of the B component is ring opened to be present as a hydroxyl group.

Specifically, in the polyester-based fiber for artificial hair of the present invention, the brominated epoxy flame retardant may be present, for example, in a form (structure) represented by the following general formula (2).

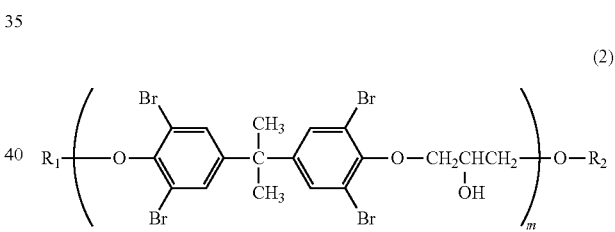

(2)

It should be noted that, in the general formula (2), m is 1 to 1,000; and $R_1$ and $R_2$ are any one of functional groups represented by the following general formulae (3) to (10) and may or may not be identical with each other. Further, in the following general formulae (7) to (10), m is 1 to 1,000; and n is 1 to 200.

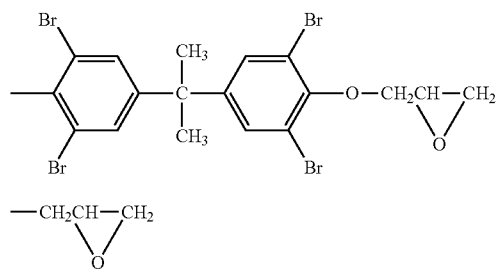

(3)

(4)

(5)

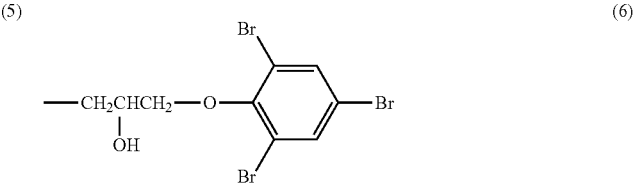

(6)

-continued

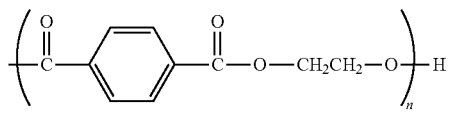
(7)

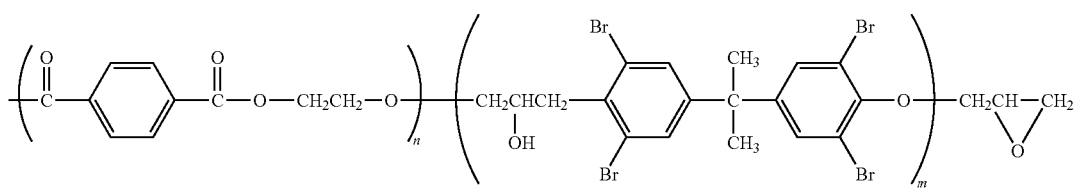
(8)

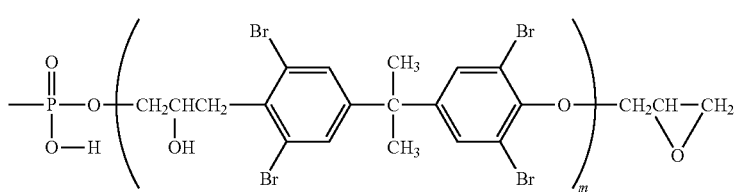
(9)

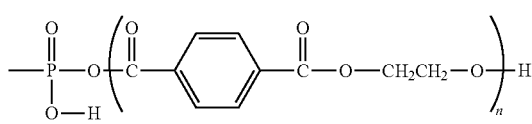
(10)

In the polyester-based fiber for artificial hair of the present invention, the brominated epoxy flame retardant may be present with any of the above-mentioned structures. It is preferred that the brominated epoxy flame retardant be present mostly in a structure with the acidic phosphorus-based compound of the C component being a cross-linking point, from the viewpoint of increasing the molecular weight of the B component. The bond between the acidic phosphorus-based compound of the C component and the B component can be confirmed, for example, as follows. The polyester-based fiber for artificial hair is dissolved in a mixed solvent of hexafluoroisopropanol and chloroform, and an insoluble part is removed and dried. Then, the insoluble part is dissolved in chloroform again to obtain a soluble part (B component). If the C component (phosphorus-based compound) remains in the soluble part, it can be determined that the C component has been bonded to the B component and is not eluted any more. In this analysis method, the content of the phosphorus-based compound in the B component is preferably 200 ppm or more, more preferably 300 ppm or more. Further, it is desired that the structure in which the B component is bonded to the A component through an ester bond be present in a predetermined amount so as to prevent the B component from being peeled from the A component to form a void in the drawing step during spinning. When the ratio of the A component with respect to the B component is too high in the molecules in which the B component and the A component are bonded to each other through an ester group, the compatibility therebetween increases excessively to make it difficult to increase an aggregate of the B component, and consequently, the effect of reducing the gloss may not be obtained sufficiently. Therefore, it is preferred that the weight of the A component be less than 50% by weight of the B component in the molecules in which the B component and the A component are bonded to each other through an ester group. In the case where the total weight of the B component and the A component is 100% by weight in the molecules in which the B component and the A component are bonded to each other through an ester group, the weight of the B component is more preferably 90% by weight or more, still more preferably 95% by weight or more.

In the polyester-based fiber for artificial hair of the present invention, it is preferred that the ratio of a component having a molecular weight of 50,000 or more in the brominated epoxy flame retardant be 25% or more. In the present invention, the ratio of the component having a molecular weight of 50,000 or more in the brominated epoxy flame retardant is measured as follows.

(1) 2 mL of a mixed solvent of hexafluoroisopropanol and chloroform (1:3) is added to 0.5 g of a sample, and the mixture is shaken at room temperature for 12 hours.

(2) 10 mL of a mixed solvent of hexafluoroisopropanol and chloroform (1:7) is added to the dissolved sample to dilute it, and the total amount of the mixture is transferred to an eggplant flask.

(3) The diluted solution of the sample is dried into a film shape by an evaporator and is further vacuum dried. 14 mL of chloroform is added to the obtained film-shaped sample, followed by ultrasonic extraction for 30 minutes.

(4) The chloroform extract is separated.

(5) 7 mL of chloroform is further added to the eggplant flask, followed by ultrasonic extraction for 10 minutes.

(6) The chloroform extract is separated.

(7) The operations (5) and (6) are repeated 5 times.

(8) All the obtained chloroform extracts are mixed and filtered. After that, the molecular weights of the chloroform extracts were analyzed by a gel permeation chromatography (GPC) measurement apparatus, and a ratio of a component having a molecular weight of 50,000 or more is determined based on the chart obtained by the GPC analysis.

In the polyester-based fiber for artificial hair of the present invention, the brominated epoxy flame retardant of the B component needs to be present as an aggregate in the polyester resin of the A component so as to reduce the gloss of the polyester-based fiber for artificial hair, and this effect is presumed to be expressed when the molecular weight of the B component is increased to enhance the viscosity. In the polyester-based fiber for artificial hair of the present invention, when the ratio of the component having a molecular weight of 50,000 or more in the B component is 25% or more, sufficiently high viscosity is obtained, and the gloss is easily reduced to a level close to that of human hair. Form the viewpoint of being excellent in the effect of reducing the gloss, in the polyester-based fiber for artificial hair of the present invention, the ratio of the component having a molecular weight of 50,000 or more in the brominated epoxy flame retardant is 28% or more, more preferably 32% or more. It should be noted that, in the polyester-based fiber for artificial hair of the present invention, it is appropriate that a predetermined amount of a polymer component is present in order to increase the viscosity of the B component, and the weight-average molecular weight of the entire B component may be less than 30,000.

The polyester resin composition contains 5 to 40 parts by weight of the brominated epoxy flame retardant with respect to 100 parts by weight of the polyester resin. The polyester resin composition contains preferably 5 to 30 parts by weight, more preferably 6 to 25 parts by weight, still more preferably 7 to 20 parts by weight of the brominated epoxy flame retardant with respect to 100 parts by weight of the polyester resin. As long as the content of the brominated epoxy flame retardant is within the above-mentioned range, the polyester-based fiber for artificial hair can have gloss close to that of human hair, and is also excellent in flame retardance, combing properties, color development, and a spinning property.

In the present invention, as described above, the acidic phosphorus-based compound of the C component is used as a catalyst and/or a cross-linking agent for increasing the molecular weight of the brominated epoxy flame retardant of the B component. For example, FIG. 1 shows molecular weight distributions obtained by conducting a GPC measurement of each brominated epoxy flame retardant in polyester-based fibers in Example 2 containing stearyl acid phosphate (mixture of monostearyl phosphate and distearyl phosphate) as the C component and in the polyester-based fibers in Comparative Example 1 not containing the C component. As is understood from FIG. 1, the component having a high molecular weight in the brominated epoxy flame retardant increases in the polyester-based fibers in Example 2 containing an acidic phosphorus-based compound having a pH of 3.5 or less.

In the present invention, when the C component has a pH of 3.5 or less, the C component has an activity for ring opening an epoxy group of the B component (hereinafter, simply referred to as "ring-opening activity"). From the viewpoint of being excellent in a ring-opening activity, the C component has a pH of preferably 3 or less, more preferably 2.5 or less, still more preferably 2 or less. When the C component has a pH of 3.5 or less, the C component has a high ring-opening activity. Therefore, the condensation reaction caused by the ring-opened epoxy group of the B component proceeds easily, and the molecular weight of the B component tends to be sufficiently large, with the result that the effect of reducing the gloss can be obtained sufficiently. In the present invention, the term "pH of 3.5 or less" means that the PH is 3.5 or less at room temperature (20±5° C.) and/or 280° C. Further, in the present invention, the pH is a value measured after 1 g of a measurement sample is dispersed in 10 g of pure water at predetermined temperature. The acidic phosphorus-based compound has an activity of ring opening an epoxy group of the B component during melt kneading of the polyester resin composition when the acidic phosphorus-based compound has a pH of 3.5 or less at 280° C. even if it does not have a pH of 3.5 or less at room temperature. Further, in the case where the C component is not dissolved in water, the pH can be measured while powder of the C component is supplied to water and dispersed therein by stirring.

No particular limitation is imposed on the C component, and it is appropriate that the C component is an acidic phosphorus-based compound having a pH of 3.5 or less. Examples of the C component include a monoalkyl phosphate ester, a monoaryl phosphate ester, a dialkyl phosphate ester, a diaryl phosphate ester, a monoalkyl phosphite ester, a monoaryl phosphite ester, a dialkyl phosphite ester, a diaryl phosphite ester, a monoalkyl phosphonate ester, a monoaryl phosphonate ester, alkyl phosphonate, aryl phosphonate, a polyphosphonic acid compound, and a phosphoric acid metal salt. Of those, the phosphoric acid metal salt mostly has low acid strength in the case of an alkali metal, and for example, monosodium dihydrogen phosphate and disodium dihydrogen pyrophosphate are not suitable for the present invention because they have insufficient acid strength due to a pH of more than 3.5. Specifically, examples of the C component include monomethyl phosphate, monoethyl phosphate, monoisopropyl phosphate, mono-n-butyl phosphate, isobutyl phosphate, mono(2-ethylhexyl)phosphate, monolauryl phosphate, monostearyl phosphate, monooleyl phosphate, monotetracosyl phosphate, monophenyl phosphate, monocresyl phosphate, mono2,6-di-tert-butyl-4-methylphenoxy phosphate, dimethyl phosphate, diethyl phosphate, diisopropyl phosphate, di-n-butyl phosphate, dibutyl phosphate, di(2-ethylhexyl)phosphate, dilauryl phosphate, distearyl phosphate, dioleyl phosphate, ditetracosyl phosphate, diphenyl phosphate, dicresyl phosphate, monomethyl phosphite, monoethyl phosphite, monoisopropyl phosphite, mono-n-butyl phosphite, isobutyl phosphite, mono(2-ethylhexyl)phosphite, monolauryl phosphite, monostearyl phosphite, monooleyl phosphite, monotetracosyl phosphite, monophenyl phosphite, monocresyl phosphite, dimethyl phosphite, diethyl phosphite, diisopropyl phosphite, di-n-butyl phosphite, dibutyl phosphite, di(2-ethylhexyl)phosphite, dilauryl phosphite, distearyl phosphite, dioleyl phosphite, ditetracosyl phosphite, diphenyl phosphite, dicresyl phosphite, methyl phosphonate, ethyl phosphonate, isopropyl phosphonate, phosphonic acid-n-butyl, isobutyl phosphonate, phosphonic acid-2-ethylhexyl, lauryl phosphonate, stearyl phosphonate, oleyl phosphonate, tetracosyl phosphonate, phenyl phosphonate, cresyl phosphonate, 1-hydroxyethane-1,1-diphosphonic acid, nitrilotris(methylenephosphonic acid), 2-phosphonobutane-1,2,4-tricarboxylic acid, N,N,N',N'-ethylenediaminetetrakis (methylenephosphonic acid), monopotassium dihydrogen pyrophosphate, monomagnesium dihydrogen pyrophosphate, monozinc dihydrogen pyrophosphate, tripolyphosphoric acid, and monoaluminum dihydrogen tripolyphosphate. Of those, the C component is preferably one or more kind selected from the group consisting of phosphoric acid compounds having one or more hydroxyl group and phosphonic acid compounds having one or more hydroxyl group. In the case where the fiber of the present invention contains an antimony compound or the case where the polyester resin of the A component is synthesized with an antimony catalyst, as described later, when the C component is a trivalent phosphorous acid compound, there is a risk in that antiomony is precipitated from the antiomony compound by a reduction reaction to color the fiber into gray color.

It is preferred that the C component have a molecular weight of 200 or more. In the case where the molecular weight of the C component is 200 or more, when the polyester resin composition is melt kneaded, the C component is not gasified to be removed, and the substantial effective component of the C component is not reduced, with the result that the gloss is unlikely to change. Further, it is preferred that the C component have an melting point of less than 280° C. or an average dispersion particle diameter of 2 μm or less. In this case, the melting point is measured by a differential scanning calorimeter (DSC) or a differential thermal analyzer (DTA), and the average dispersion particle diameter refers to a median diameter (d50) measured by a laser diffraction particle size analyzer. When the melting point is less than 280° C. or the average dispersion particle diameter is 2 μm or less, the contact area between the C component and the B component does not decrease to degrade the reaction efficiency, and the molecular weight of the B component is likely to increase, and the sufficient effect of reducing the gloss is obtained easily. From the above-mentioned viewpoint, it is preferred to use, as the C component, monolauryl phosphate, monostearyl phosphate, monooleyl phosphate, monotetracosyl phosphate, monophenyl phosphate, monocresyl phosphate, mono2,6-di-tert-butyl-4-methylphenoxy phosphate, di(2-ethylhexyl) phosphate, dilauryl phosphate, distearyl phosphate, dioleyl phosphate, ditetracosyl phosphate, diphenyl phosphate, dicresyl phosphate, lauryl phosphonate, stearyl phosphonate, oleyl phosphonate, tetracosyl phosphonate, phenyl phosphonate, cresyl phosphonate, 1-hydroxyethane-1,1-diphosphonic acid, nitrilotris (methylenephosphonic acid), 2-phosphonobutane-1,2,4-tricarboxylic acid, N,N,N',N'-ethylenediaminetetrakis(methylenephosphonic acid), monopotassium dihydrogen pyrophosphate, monomagnesium dihydrogen pyrophosphate, monozinc dihydrogen pyrophosphate, tripolyphosphoric acid, and monoaluminum dihydrogen tripolyphosphate. As the C component, the above-mentioned compounds may be used alone or in combination of two or more kinds.

The polyester resin composition contains 0.05 to 5 parts by weight of the acidic phosphorus-based compound having a pH of 3.5 or less with respect to 100 parts by weight of the polyester resin. The polyester resin composition contains preferably 0.1 to 2 parts by weight, more preferably 0.2 to 1.5 parts by weight, still more preferably 0.4 to 1.5 parts by weight of the acidic phosphorus-based compound having a pH of 3.5 or less with respect to 100 parts by weight of the polyester resin. When the content of the acidic phosphorus-based compound having a pH of 3.5 or less is within the above-mentioned range, the gloss of the polyester-based fiber for artificial hair can be rendered close to that of human hair, and is also excellent in flame retardance, color development, and a spinning property.

It is preferred that the polyester resin composition further contain 0 to 5 parts by weight of a thickener (hereinafter, also referred to as "D component") with respect to 100 parts by weight of the polyester resin. In the polyester resin composition, the lower limit value of an addition amount of the thickener is more preferably 0.1 parts by weight, still more preferably 0.2 parts by weight, still further preferably 0.4 parts by weight, particularly preferably 0.8 parts by weight with respect to 100 parts by weight of the polyester resin. In the polyester resin composition, the upper limit value of an addition amount of the thickener is more preferably 4 parts by weight, still more preferably 3 parts by weight, still further preferably 2 parts by weight with respect o 100 parts by weight of the polyester resin. In the present invention, the D component has the effect of increasing the viscosity of the polyester resin of the A component, and is used for further enhancing a spinning property, flame retardance, and combing properties.

It is preferred that the thickener be an organic compound having three or more at least one kind of a functional group selected from the group consisting of a hydroxyl group, an ester group, an epoxy group, and a carboxylic acid group in molecules. Thus, when the D component has three or more functional groups (reaction points) in molecules, the transesterification between the A component and the D component proceeds during melt kneading, and the molecules of the polyester resin have a branched structure, which greatly increases the viscosity compared with ordinary straight-chain molecules. Examples of the thickener include glycerine, a glycerine fatty acid ester, a glycerine dibasic acid ester, a glycerine dibasic acid fatty acid ester, a glycerine phosphoric acid ester, erythritol, an erythritol fatty acid ester, an erythritol dibasic acid ester, an erythritol dibasic acid fatty acid ester, an erythritol phosphoric acid ester, pentaerythritol, a pentaerythritol fatty acid ester, a pentaerythritol dibasic acid ester, a pentaerythritol dibasic acid fatty acid ester, a pentaerythritol phosphoric acid ester, xylitol, a xylitol fatty acid ester, a xylitol dibasic acid ester, a xylitol dibasic acid fatty acid ester, a xylitol phosphoric acid ester, sorbitol, a sorbitol fatty acid ester, a sorbitol dibasic acid ester, a sorbitol dibasic acid fatty acid ester, a sorbitol phosphoric acid ester, sorbitan, a sorbitan fatty acid ester, a sorbitan dibasic acid ester, a sorbitan dibasic acid fatty acid ester, a sorbitan phosphoric acid ester, trimethylolpropane, malic acid, a malic acid ester, citric acid, a citric acid ester, tartaric acid, a tartaric acid ester, trimellitic acid, trimellitic anhydride, a trimellitic acid ester, a trimellitic anhydride ester, pyromellitic acid, pyromellitic anhydride, a pyromellitic acid ester, a pyromellitic anhydride ester, polyvinyl alcohol, a polyvinyl alcohol copolymer, polyacrylate, a polyacrylate copolymer, polyglycidyl methacrylate, a polyglycidyl methacrylate copolymer, triglycidyltriazine, and a polyepoxy resin. Of those, a polyhydric alcohol compound obtained by esterifying polyhydric alcohol with at least one kind of an acid component selected from the group consisting of carboxylic acid, phosphoric acid, and phosphonic acid is preferred. In the case where the D component is a polyhydric alcohol compound, the transesterification of the D component proceeds mainly with the A component, and hence the viscosity of the polyester resin can be increased efficiently. On the other hand, when the D component is polycarboxylic acid or a polyepoxy-containing compound, the reaction with the B component also proceeds, and mixed molecules of the A component and the B component increase. Therefore, the compatibility between the A component and the B component increases, and in some cases, the sufficient effect of reducing the gloss may not be obtained. Further, when the end of the D component is a hydroxyl group, the hydrolysis also proceeds in parallel with the branching of the A component molecules, and hence the viscosity may decrease. Therefore, the D component is preferably a polyhydric alcohol compound obtained by esterifying polyhydric alcohol with an acid component such as carboxylic acid, phosphoric acid, and phosphonic acid, more preferably a polyhydric alcohol compound obtained by esterifying polyhydric alcohol with phosphoric acid from the viewpoint that an ester bond portion comes off easily during heating. More preferably, as the D component, a glycerine fatty acid ester, a glycerine phosphoric acid ester, a pentaerythritol fatty acid ester, a pentaerythritol dibasic acid fatty acid ester, a pentaerythritol phosphoric acid ester, pentaerythritol diphosphate, pentaerythritol diphosphite, dialkylpentaerythritol diphosphate, dialkylpentaerythritol diphosphite, diarylpentaerythritol diphosphate, diarylpentaerythritol diphosphite, or a sorbitan fatty acid ester is used. As the pentaerythritol diphosphite, for example, bis(2,6-di-tert-butyl-4-methylphenyl) pentaerythritol diphosphite or the like can be used, and as the pentaerythritol dibasic acid fatty acid ester, for example, pentaerythritol adipic acid stearic acid ester or the like can be used.

It is preferred that the polyester resin composition further contain 0 to 5 parts by weight of an antimony compound (hereinafter, also referred to as "E component") with respect to 100 parts by weight of the polyester resin. In the present invention, the E component has the effect of further enhancing the flame retardance of the polyester-based fiber for artificial hair, and is appropriately used in the case where it is necessary to enhance flame retardance.

No particular limitation is imposed on the antimony compound of the E component as long as the antimony compound is a compound having antimony atoms, and an antimony oxide is generally used due to the ease of handling as a powder material. Examples of the antimony compound include antimony trioxide, antimony tetraoxide, antimony pentoxide, and sodium antimonite. Those compounds may be used alone or in combination of two or more kinds. It should be noted that, there arise no problems even when the antimony compound of the E component reacts with a halogen element or a phosphorus element to change to another compound during melt kneading. Further, from the viewpoints of a spinning property and color development, the E component preferably has a small particle diameter, and has an average particle diameter of preferably 5 μm or less, more preferably 2 μm or less. In this case, the average particle diameter refers to a median diameter (d50) measured by a laser diffraction particle size analyzer.

The polyester-based fiber for artificial hair of the present invention is obtained by melt spinning the polyester resin composition by an ordinary melt spinning method. The polyester resin composition can be obtained by dry blending each of the above-mentioned components, and melt kneading the mixture through use of various general kneaders. Examples of the kneaders include a single screw extruder, a twin screw extruder, a roll, a banbury mixer, and a kneader. Of those, the twin screw extruder is preferred from the viewpoint of the adjustment of a kneading degree and the ease of an operation.

In the case where the polyester-based fiber for artificial hair of the present invention is melt spun by an ordinary melt spinning method, for example, the temperatures of an extruder, a gear pump, a spinneret, and the like are set to 250 to 310° C., the polyester resin composition is melt spun to allow a spun yarn to pass through a heating pipe, the spun yarn is cooled to a glass transition point or less of the polyester resin and taken up at a speed of 50 to 5,000 m/min., and thus the spun yarn (undrawn yarn) is obtained. Alternatively, the following is also possible: the spun yarn is cooled in a water tank containing water for cooling, and the fineness thereof is controlled. The temperature and length of the heating pipe, the temperature and spray amount of cooling air, the temperature of a cooling water tank, and the cooling time and take-up speed can be appropriately adjusted by the discharge amount of a polymer and the number of holes of the spinneret.

In the present invention, it is preferred that the obtained spun yarn (undrawn yarn) be hot drawn. The drawing may be performed any of a two-step method that involves drawing the spun yarn after taking it up temporarily, and a direct spinning drawing method that involves continuously drawing the spun yarn without taking it up. The hot drawing is performed by a one-stage drawing method or a multi-stage drawing method of two or more stages. As heating means in the hot drawing, a heating roller, a heat plate, a steam jet device, a hot water tank, or the like can be used, and these heating means can also be used appropriately in combination.

As necessary, the polyester-based fiber for artificial hair of the present invention can contain various kinds of additives such as a flame retardant other than the B component, a heat-resistant agent, a photostabilizer, a fluorescer, an antioxidant, an antistatic agent, a pigment, a plasticizer, and a lubricant. By allowing the polyester-based fiber for artificial hair to contain a pigment, spun-dyed fibers can be obtained. Further, the polyester-based fiber for artificial hair can be rendered closer to human hair by adjusting touch and soft texture through use of an oil such as a fiber surface treatment agent and a softener.

It is preferred that the polyester-based fiber for artificial hair of the present invention be fibers in the form of non-crimped yarn. Further, from the viewpoint of being suitable for artificial human hair, the fineness of the fiber is preferably 10 to 100 dtex, more preferably 20 to 90 dtex, still more preferably 35 to 80 dtex.

The polyester-based fiber for artificial hair of the present invention has gloss close to that of human hair, and also has satisfactory flame retardance, a spinning property, and color development. Further, it is preferred that the polyester-based fiber for artificial hair of the present invention also have satisfactory combing properties. Further, the polyester-based fiber for artificial hair of the present invention is excellent in a curl setting property using a heat instrument for beauty treatment (hair iron, etc.), and is also excellent in a curl retentive property. Further, it is preferred that the polyester-based fiber for artificial hair of the present invention have heat resistance enabling a heat instrument for beauty treatment (hair iron, etc.) to be used at 160 to 240° C., and be unlikely to ignite and have a self-extinguishing property. Further, by adding a dull additive if necessary, the unevenness can be provided to the fiber surface, and consequently, the gloss of the fiber can be appropriately suppressed so as to be used more suitably as artificial hair.

In the case where the polyester-based fiber for artificial hair of the present invention is spun-dyed, the fiber can be used as it is. However, in the case where the fiber is not spun-dyed, the fiber can be dyed under the same condition as that of ordinary polyester fibers. As a pigment, a dye, an assistant, and the like to be used for dying, those having weather resistance and flame retardance are preferred.

The polyester-based fiber for artificial hair of the present invention can be directly used alone as artificial hair. Alternatively, the polyester-based fiber for artificial hair of the present invention can be used as artificial hair in combination with other fiber materials for artificial hair such as modacrylic fibers, polyvinyl chloride fibers, nylon fibers, and the like, and natural fibers such as human hair and animal hair.

A hair ornament product formed through use of the polyester-based fiber for artificial hair of the present invention is excellent in gloss, flame retardance, and color development. Further, preferably, the hair ornament product has satisfactory combing properties. No particular limitation is imposed on the hair ornament product, and examples thereof include a hair wig, a hairpiece, a weaving, a hair extension, braid hair, a hair accessory, and dole hair.

The hair ornament product may be formed only of the polyester-based fiber for artificial hair of the present invention. Further, the hair ornament product may be formed by combining the polyester-based fiber for artificial hair of the present invention with other fibers for artificial hair such as modacrylic fibers, polyvinyl chloride fibers, nylon fibers, and the like, and natural fibers such as human hair and animal hair.

Human hair to be used for a hair ornament product such as a hairpiece, a hair wig, or an hair extension is generally cuticle treated, decolorized, and dyed, and in order to ensure touch and combing properties, a silicone-based fiber surface treatment agent and a softener are used. Therefore, unlike untreated human hair, the human hair to be used for a hair ornament product has flammability. However, in the case where the polyester-based fiber for artificial hair of the present invention is mixed with human hair, with a human hair mixed ratio being 60% or less, the resultant hair ornament product exhibits satisfactory flame resistance.

EXAMPLES

Next, the present invention is further specifically described by way of examples. It should be noted that the present invention is not limited those examples.

Table 1 shows phosphorus-based compounds used in the examples and the comparative examples and non-phosphorus acidic compounds used in the comparative examples. The other materials are as follows. It should be noted that, regarding reagents whose manufacturers are not specified particularly below, commercially available general reagents were used.

Polyethylene terephthalate: manufactured by Mitsubishi Chemical Corporation, "BK-2180" (trade name), IV value=0.83
Brominated epoxy flame retardant: manufactured by Sakamoto Yakuhin Kogyo Co., Ltd., "SR-T2MP" (trade name), weight-average molecular weight: about 30,000, epoxy-terminated brominated epoxy flame retardant.
Sodium antimonite: manufactured by Nihon Seiko Co., Ltd. "SA-A" (trade name) Thickener 1: bis(2,6-di-tert-butyl-4-methylphenyl)pentaerythritol-diphosphite, manufactured by ADEKA Corporation, "PEP36" (trade name)
Thickener 2: distearyl pentaerythritol diphosphite, manufactured by ADEKA Corporation, "PEPS" (trade name)
Thickener 3: pentaerythritol adipic acid stearic acid ester, manufactured by Riken Vitamin Co., Ltd., "EW100" (trade name)

In the above-mentioned Table 1, the phosphorus-based compound 2 is manufactured by Chelest Corporation; the phosphorus-based compound 3 is manufactured by Johoku Chemical Co., Ltd.; the phosphorus-based compounds 1, 5 and 6 are manufactured by ADEKA Corporation; and the other phosphors-based compounds are commercially available general reagents. The non-phosphorus acidic compounds are manufactured by Wako Pure Chemical Industries, Ltd. Each pH of the phosphorus-based compounds and the non-phosphorus acidic compounds is a value measured after 1 g of a compound is dispersed in 10 g of pure water at room temperature (20±5° C.).

Examples 1 to 8

The above-mentioned respective materials were dried to a moisture amount of 100 ppm or less and dry blended in blending ratios shown in the following Table 2. Each obtained polyester resin composition was supplied to a twin screw extruder, melt kneaded at 280° C., and pelletized, followed by being dried to a moisture amount of 100 ppm or less. Then, the dried pellet was supplied to a melt spinning machine, and a molten polymer was extruded at 280° C. through a spinneret with nozzle holes having a nozzle diameter of 0.5 mm and a circular cross-section. The extruded polymer was allowed to pass through a heating pipe, then cooled to a glass transition temperature or less of the polyester resin, and taken up at a speed of 60 to 150 m/min to obtain a spun yarn. The obtained spun yarn was drawn at 80° C. to obtain a threefold drawn yarn, and was heat treated through use of a heat roll heated to 200° C. to obtain polyester-based fibers (multifilament) having a single filament fineness of about 60 dtex.

Comparative Examples 1 to 7

Polyester-based fibers (multifilament) having a single filament fineness of about 60 dtex were obtained in the same way as in Examples 1 to 8 except that the above-mentioned respec-

TABLE 1

| | | pH | Molecular weight | Melting point (° C.) | Average dispersion particle diameter |
|---|---|---|---|---|---|
| Phosphorus-based compound 1 | Stearyl add phosphate (mixture of monostearyl phosphate and distearyl phosphate) | 2 | 490 | 70 | 0.1 μm or less |
| Phosphorus-based compound 2 | Ethylenediamine tetramethylene phosphonic acid | 1 | 326 | 195 | 0.1 μm or less |
| Phosphorus-based compound 3 | Zinc stearyl add phosphate (neutralized salt) | 8 | 534 | 90 | 0.1 μm or less |
| Phosphorus-based compound 4 | Triphenyl phosphate | 7 | 326 | 50 | 0.1 μm or less |
| Phosphorus-based compound 5 | Tris(2,4di-tert-butylphenyl)phosphite | 7 | 647 | 185 | 0.1 μm or less |
| Phosphorus-based compound 6 | Methylenebis(4,6-di-butylphenyl) octyl phosphite | 7 | 583 | 150 | 0.1 μm or less |
| Phosphorus-based compound 7 | Monosodium dihydrogen phosphate | 4.5 | 120 | 230 | 5 μm |
| Phosphorus-based compound 8 | Disodium dihydrogen pyrophosphate | 3.9 | 222 | 250 | 10 μm | tive materials were dried to a moisture amount of 100 ppm or less and dry blended in blending ratios shown in the following Table 3.

Comparative Example 8

The above-mentioned respective materials were dried to a moisture amount of 100 ppm or less and dry blended in blending ratios shown in the following Table 3. The obtained polyester resin composition was supplied to a twin screw extruder by melt kneading at 280° C. and pelletized. Then, the obtained pellet was dried to a moisture amount of 100 ppm or less. Then, an attempt was made to perform spinning by supplying the dried pellet to a melt spinning machine and extruding a molten polymer at 280° C. through a spinneret with nozzle holes having a nozzle diameter of 0.5 mm and a circular cross-section. However, the spun yarn was not obtained.

In the polyester-based fibers in the examples and the comparative examples, a ratio of a component having a molecular weight of 50,000 or more in the brominated epoxy flame retardant (hereinafter, also referred to as "ratio of a molecular weight of 50,000 or more in a flame retardant"), gloss, combing properties, flame retardance (dripping resistance), and colorability were evaluated as below. Tables 2 and 3 show the results. Further, the melt viscosity and spinning property of the polyester resin compositions in the examples and the comparative examples were evaluated as follows. Tables 2 and 3 show the results.

(Ratio of a molecular weight of 50,000 or more in a flame retardant)

(1) 2 mL of a mixed solvent of hexafluoroisopropanol and chloroform (1:3) was added to about 0.5 g of a sample (fibers), and the mixture was shaken at room temperature for 12 hours.

(2) 10 mL of a mixed solvent of hexafluoroisopropanol and chloroform (1:7) was added to the dissolved sample to dilute it, and the total amount of the mixture was transferred to an eggplant flask.

(3) The diluted solution of the sample was dried into a film shape by an evaporator and was further vacuum dried. 14 mL of chloroform was added to the obtained film-shaped sample, followed by ultrasonic extraction for 30 minutes.

(4) The chloroform extract was separated.

(5) 7 mL of chloroform was further added to the eggplant flask, followed by ultrasonic extraction for 10 minutes.

(6) The chloroform extract was separated.

(7) The operations (5) and (6) were repeated 5 times.

(8) All the obtained chloroform extracts were mixed and filtered. After that, the molecular weights of the chloroform extracts were analyzed by a gel permeation chromatography (GPC) measurement apparatus, and a ratio of a component having a molecular weight of 50,000 or more in a flame retardant was determined based on the chart obtained by the GPC analysis.

(Gloss)

Gloss was determined visually under the sunlight through use of a tow filamant having a length of 30 cm and a total fineness of 100,000 dtex, based on the following standard.

A: Equal to the gloss of human hair.

B: Almost equal to the gloss of human hair.

C: Although there is a slight difference from the gloss of human hair, there is no feeling of wrongness.

D: There is a feeling of wrongness due to the difference from the gloss of human hair.

E: There is a remarkable difference from glass of human hair.

(Dripping Resistance)

0.7 g of filaments cut to a length of 150 mm were bound, and the bound filaments were fixed at a stand with one end thereof sandwiched by a clamp so that an effective length was 120 mm and allowed to hang vertically. Flame of 20 mm was brought into contact with the fixed filaments for 3 seconds and a combustion time after the flame was moved away from the filaments was measured and evaluated based on the following standard.

A: Combustion time is less than 2 seconds, and dripping does not occur.

B: Combustion time is 2 seconds or more and less than 5 seconds, and dripping does not occur.

C: Combustion time is less than 5 seconds, and dripping occurs once.

D: Combustion time is 5 seconds or more, or dripping occurs twice or more.

(Combing Properties)

A tow filament having a length of 30 cm and a total fineness of 100,000 dtex was soaked in an aqueous solution containing 3% by weight of a PO/EO random copolymer (polypropylene oxide/polyethylene oxide random copolymer, manufactured by Marubishi Oil Chemical Co., Ltd., "Conditioner Type-Q", molecular weight: 20,000) serving as a fiber surface treatment agent and a cationic antistatic agent (manufactured by Marubishi Oil Chemical Co., Ltd., "Processing Oil Agent No. 29" (trade name)) (weight ratio of 75:25) so that 0.1% by weight each of the PO/EO random copolymer and the cationic antistatic agent adhered to the tow filament, and the resultant tow filament was dried at 80° C. for 5 minutes. Combing properties were evaluated by allowing a comb made of a polyacetal resin (manufactured by Uehara Cell, "NEW-DELRIN-COMB No. 826 (trade name)) to pass through the treated tow filament at a speed of 0.3 m/s from a position of 3 cm from the top of the tow filament completely 30 times or more.

A: There is almost no resistance (light).

B: There is slight resistance (slightly heavy).

C: There is high resistance or the comb gets trapped in the tow filament (heavy).

D: The comb does not pass through the tow filament.

(Colorability)

The colorability was determined visually under the sunlight through use of a tow filament having a length of 30 cm and a total fineness of 100,000 dtex based on the following standard.

A: The tow filament is white and can be applied to all the colors.

B: Although the tow filament is slightly discolored, it can be applied to all the colors by adjusting a pigment.

C: Although the tow filament is colored and difficult to be applied to light colors, it can be applied to dark colors.

D: The tow filament is colored conspicuously and cannot be used as fibers for hair.

(Melt Viscosity)

A melt viscosity (poise) of a polyester resin composition (pellet) was measured under the conditions of a test speed of 50 mm/min, an orifice of 0.05 cm, a barrel radius of 0.4775 cm, and a barrel temperature of 280° C. through use of a capilograph (manufactured by Toyo Seiki Seisaku-sho, Ltd., "CAPILOGRAPH 3B" (Model No.)).

(Spinning Property)

A spinning property was determined from the breakage of a yarn during spinning and fineness unevenness based on the following standard.

A: Spinning can be performed stably, and fineness unevenness is small.

B: Although spinning can be performed stably, fineness unevenness is large or the clogging of a nozzle occurs slightly.

C: Spinning cannot be performed stably due to the breakage of a yarn, fusion, clogging of a nozzle, and fineness unevenness is remarkably large.

TABLE 2

|  | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- |
| Polyester resin (parts by weight) | 100 | 100 | 100 | 100 | 100 | 100 | 100 | 100 |
| Brominated epoxy flame retardant (parts by weight) | 20 | 20 | 20 | 20 | 20 | 20 | 20 | 20 |
| Phosphorus-based compound 1 (parts by weight) | 0.4 | 0.8 | 1.2 | 0.2 |  | 0.4 | 0.4 | 0.8 |
| Phosphorus-based compound 2 (parts by weight) |  |  |  |  | 0.6 |  |  |  |
| Thickener 1 (parts by weight) |  |  |  |  |  | 0.8 | 0.8 |  |
| Thickener 2 (parts by weight) |  |  |  |  |  |  | 0.8 |  |
| Thickener 3 (parts by weight) |  |  |  |  |  |  |  | 0.8 |
| Antimony compound (parts by weight) | 2 | 2 | 2 | 2 | 2 | 2 | 2 | 2 |
| Ratio of molecular weight of 50,000 or more in flame retardant (%) | 26 | 31 | 34 | 38 | 25 | 29 | 30 | 31 |
| Gloss | C | B | A | A | C | B | B | B |
| Combing properties | A | B | C | C | A | A | A | A |
| Dripping resistance | A | B | C | C | A | A | A | A |
| Colorability | A | A | A | B | A | A | B | A |
| Melt viscosity (poise) | 2600 | 2100 | 1500 | 1200 | 4000 | 3200 | 2900 | 2600 |
| Spinning property | A | A | B | B | B | A | A | A |

* Ex.: Example

TABLE 3

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
| --- | --- | --- | --- | --- | --- | --- | --- | --- |
| Polyester resin (parts by weight) | 100 | 100 | 100 | 100 | 100 | 100 | 100 | 100 |
| Brominated epoxy flame retardant (parts by weight) | 20 | 20 | 20 | 20 | 20 | 20 | 20 | 20 |
| Phosphorus-based compound 3 (parts by weight) |  | 0.8 |  |  |  |  |  |  |
| Phosphorus-based compound 4 (parts by weight) |  |  | 0.8 |  |  |  |  |  |
| Phosphorus-based compound 5 (parts by weight) |  |  |  | 0.8 |  |  |  |  |
| Phosphorus-based compound 6 (parts by weight) |  |  |  |  | 0.8 |  |  |  |
| Phosphorus-based compound 7 (parts by weight) |  |  |  |  |  | 0.8 |  |  |
| Phosphorus-based compound 8 (parts by weight) |  |  |  |  |  |  | 0.8 |  |
| Non-phosphorus acidic compound |  |  |  |  |  |  |  | 0.8 |
| Antimony compound (parts by weight) | 2 | 2 | 2 | 2 | 2 | 2 | 2 | 2 |
| Ratio of molecular weight of 50,000 or more in flame retardant (%) | 23 | 23 | 23 | 23 | 23 | 23 | 24 |  |
| Gloss | E | E | E | E | E | E | E |  |
| Combing properties | A | A | A | A | A | A | A |  |

TABLE 3-continued

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|
| Dripping resistance | A | A | A | A | A | A | A |  |
| Colorability | A | A | A | A | C | A | A |  |
| Melt viscosity (poise) | 3100 | 3050 | 3000 | 3150 | 3150 | 2950 | 2900 | 350 |
| Spinning property | A | A | A | A | A | B | B | Spinning impossible |

* Com. Ex.: Comparative Example

As is apparent from Table 2, in the examples including the acidic phosphorus-based compound having a pH of 3.5 or less, polyester-based fibers for artificial hair having gloss close to that of human hair and having satisfactory flame retardance (dripping resistance) and a spinning property were obtained. Further, in Examples 5 to 8 using the thickener, it was confirmed that the combing properties, flame retardance (dripping resistance), and a spinning property are further enhanced. On the other hand, as is understood from the results of Table 3, in the comparative examples not including the acidic phosphorus-based compound having a pH of 3.5 or less and including the acidic phosphorus-based compound having a pH of more than 3.5, the polyester-based fibers for artificial hair having gloss close to that of human hair were not obtained. Further, in Comparative Example 8 including the non-phosphorus acidic compound having a pH of 3.5 or less, spinning was not able to be performed. In the case of using a non-phosphorus acidic compound, the effect of accelerating the decomposition of a polyester resin was very large compared with that of the acidic phosphorus-based compound, and hence the viscosity decreased greatly. Thus, a yarn was not able to be obtained normally during spinning.

INDUSTRIAL APPLICABILITY

According to the present invention, a polyester-based fiber for artificial hair and a hair ornament product which have gloss close to that of human hair and which are excellent in color development, flame retardance (dripping resistance), and a spinning property can be provided.

The invention claimed is:

1. A polyester-based fiber for artificial hair formed of a polyester resin composition,
   wherein the polyester resin composition contains 5 to 40 parts by weight of a brominated epoxy flame retardant and 0.05 to 5 parts by weight of an acidic compound with respect to 100 parts by weight of a polyester resin,
   the polyester resin is one or more kind of resin selected from the group consisting of polyalkylene terephthalate and copolymerized polyester containing polyalkylene terephthalate as a main component, and
   the acidic compound is an acidic phosphorus-based compound having a pH of 3.5 or less.

2. The polyester-based fiber for artificial hair according to claim 1, wherein the acidic phosphorus-based compound is one or more kind selected from the group consisting of a phosphoric acid compound having one or more hydroxyl group and a phosphonic acid compound having one or more hydroxyl group.

3. The polyester-based fiber for artificial hair according to claim 1, wherein the polyester resin composition contains 0.1 to 5 parts by weight of a thickener with respect to 100 parts by weight of the polyester resin.

4. The polyester-based fiber for artificial hair according to claim 1, wherein the polyester resin composition contains 0 to 5 parts by weight of an antimony compound with respect to 100 parts by weight of the polyester resin.

5. The polyester-based fiber for artificial hair according to claim 1, wherein the polyalkylene terephthalate is at least one kind of a polymer selected from the group consisting of polyethylene terephthalate, polypropylene terephthalate, polybutylene terephthalate, and polycyclohexanedimethylene terephthalate.

6. The polyester-based fiber for artificial hair according to claim 1, wherein the brominated epoxy flame retardant is a flame retardant represented by the following general formula (1):

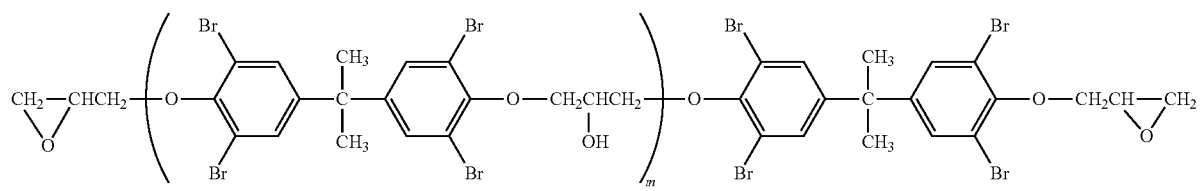

wherein, in the general formula (1), m is 1 to 1,000.

7. The polyester-based fiber for artificial hair according to claim 6, wherein the brominated epoxy flame retardant has a weight-average molecular weight of 2,000 to 40,000.

8. The polyester-based fiber for artificial hair according to claim 1, wherein a ratio of a component having a molecular weight of 50,000 or more in the brominated epoxy flame retardant is 25% or more in the polyester-based fiber for artificial hair.

9. The polyester-based fiber for artificial hair according to claim 1, wherein the brominated epoxy flame retardant is present in a structure represented by the following general formula (2) in the polyester-based fiber for artificial hair:

(2)

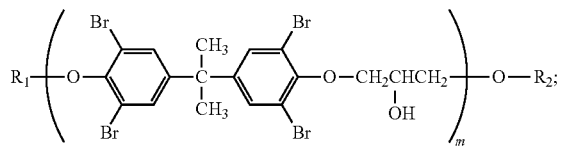

wherein, in the general formula (2), m is 1 to 1,000, and $R_1$ and $R_2$ are any one of functional groups represented by the following general formulae (3) to (10) and may or may not be identical with each other; wherein, in the following general formulae (7) to (10), m is 1 to 1,000, and n is 1 to 200;

(3)

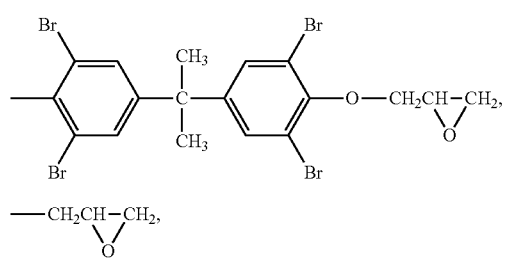

(5)

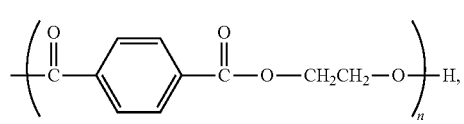

(7)

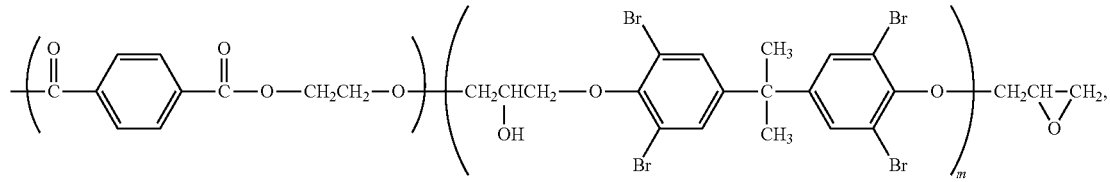

(8)

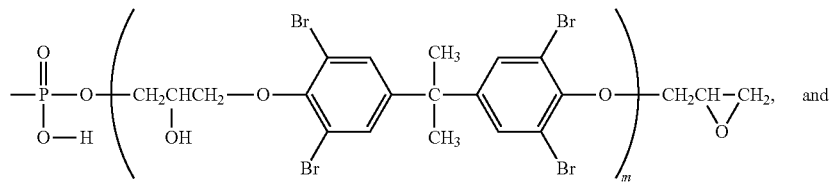

(9)

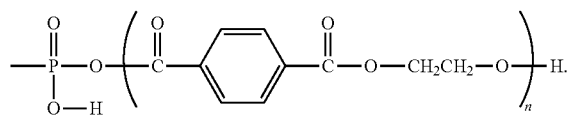

10. The polyester-based fiber for artificial hair according to claim 3, wherein the thickener is an organic compound having three or more at least one kind of a functional group selected from the group consisting of a hydroxyl group, an ester group, an epoxy group, and a carboxylic acid group in a molecule.

11. A hair ornament product comprising the polyester-based fiber for artificial hair according to claim 1.

12. The polyester-based fiber for artificial hair according to claim 1, wherein the acidic phosphorus-based compound has a molecular weight of 200 or more.

13. The polyester-based fiber for artificial hair according to claim 1, wherein the acidic phosphorus-based compound is one or more selected from the group consisting of monolauryl phosphate, monostearyl phosphate, monooleyl phosphate, monotetracosyl phosphate, monophenyl phosphate, monocresyl phosphate, mono2,6-di-tert-butyl-4-methylphenoxy phosphate, di(2-ethylhexyl)phosphate, dilauryl phosphate, distearyl phosphate, dioleyl phosphate, ditetracosyl phosphate, diphenyl phosphate, dicresyl phosphate, lauryl phosphonate, stearyl phosphonate, oleyl phosphonate, tetracosyl phosphonate, phenyl phosphonate, cresyl phosphonate, 1-hydroxyethane-1,1-diphosphonic acid, nitrilotris (methylenephosphonic acid), 2-phosphonobutane-1,2,4-tricarboxylic acid, N,N,N',N'-ethylenediaminetetrakis(methylenephosphonic acid), monopotassium dihydrogen pyrophosphate, monomagnesium dihydrogen pyrophosphate, mono zinc dihydrogen pyrophosphate, tripolyphosphoric acid, and mono aluminum dihydrogen tripolyphosphate.

(4)

—H, (6)

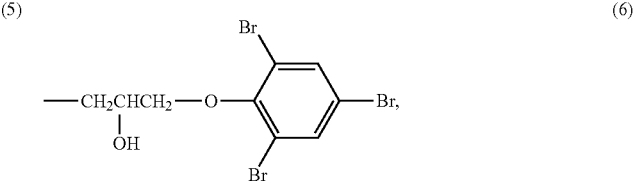

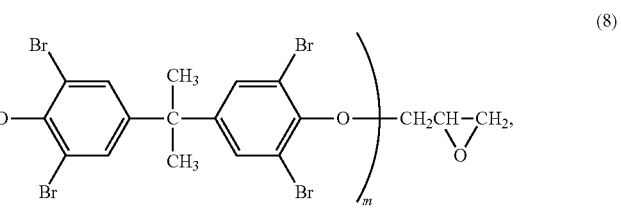

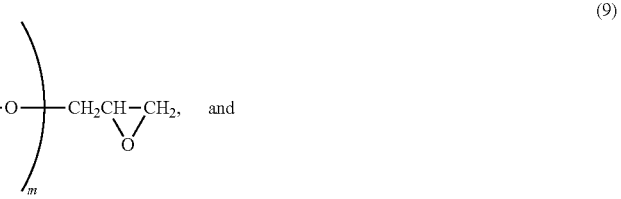

(10)

\* \* \* \* \*